(12) United States Patent
Tesfagaber

(10) Patent No.: US 7,053,338 B1
(45) Date of Patent: May 30, 2006

(54) ELECTRIC COOKER

(76) Inventor: Zekarias K. Tesfagaber, P.O. Box 33193, Seattle, WA (US) 98133

( * ) Notice: Subject to any disclaimer, the term of this patent is extended or adjusted under 35 U.S.C. 154(b) by 0 days.

(21) Appl. No.: 11/177,671

(22) Filed: Jul. 8, 2005

(51) Int. Cl.
*A47J 27/00* (2006.01)
*A47J 37/10* (2006.01)

(52) U.S. Cl. .................... 219/438; 99/403; 99/444; 220/573.1; 126/383.1; 126/389.1

(58) Field of Classification Search .................. None
See application file for complete search history.

(56) References Cited

U.S. PATENT DOCUMENTS

| | | | |
|---|---|---|---|
| 1,005,166 A | 10/1911 | Crombie | |
| 2,010,664 A * | 8/1935 | Hanks | 219/441 |
| 2,515,641 A | 7/1950 | Ellsworth et al. | |
| 2,582,735 A | 1/1952 | Alaj | |
| 2,969,452 A | 1/1961 | Geller et al. | |
| 3,010,006 A | 11/1961 | Schwaneke | |
| 3,275,801 A | 9/1966 | Churchill | |
| 3,448,798 A * | 6/1969 | Coe | 165/168 |
| 3,831,002 A | 8/1974 | Mysicka et al. | |
| 3,875,370 A * | 4/1975 | Williams | 219/386 |
| 3,920,147 A | 11/1975 | Hiatt | |
| 4,045,653 A | 8/1977 | Soper et al. | |
| 4,052,590 A * | 10/1977 | Anderl et al. | 219/438 |
| 4,099,512 A * | 7/1978 | Noonan | 126/246 |
| 4,115,918 A | 9/1978 | Anderl et al. | |
| D265,538 S | 7/1982 | Nauheimer et al. | |
| 4,458,139 A | 7/1984 | McClean | |
| 4,485,801 A * | 12/1984 | Hodges et al. | 126/386.1 |
| 5,365,038 A * | 11/1994 | Mitsugu | 219/386 |
| 5,415,082 A * | 5/1995 | Nagao | 99/403 |
| 5,511,466 A * | 4/1996 | Dzibinski | 99/339 |
| 5,555,994 A * | 9/1996 | Chen | 220/287 |
| 5,778,768 A | 7/1998 | McClean | |
| 6,298,775 B1 * | 10/2001 | Chen | 99/422 |
| 6,401,602 B1 * | 6/2002 | Lin | 99/339 |
| 6,546,848 B1 * | 4/2003 | Ehlhardt et al. | 99/403 |
| 6,552,306 B1 | 4/2003 | Edmonds | |
| 2004/0187702 A1 | 9/2004 | Xu | |

* cited by examiner

*Primary Examiner*—Joseph Pelham
(74) *Attorney, Agent, or Firm*—Dowrey Rickards PLLC

(57) ABSTRACT

In one aspect, an electric cooker comprises a pan that may have a planar upper surface portion, and a lid configured such that condensation that collects on its inner surface drains outside the pan. In another aspect, a serpentine heating element may be mounted to the bottom of the pan along a course that reduces disparity in heating of the upper surface of the pan.

8 Claims, 3 Drawing Sheets

ELECTRIC COOKER

BACKGROUND

There are numerous types of foods that are prepared as thin, flat layers, such as crepes, pita and flatbreads. Such foods may be fairly delicate, and tearing or breaking apart of such foods is frequently undesirable.

One example of such a food is the east African staple known as engera. Engera has traditionally been prepared over a wood or other fire on a ceramic cooker that has a relatively flat surface. The engera is traditionally cooked on such a cooker under a cover that may be made from mud or clay.

The typical engera is very thin, being prepared from a relatively thin batter made up of water, yeast and flour, such as flour made from sorghum, corn or teff (a plant in the grass family that grows in east Africa). A substantial amount of water vapor is evolved during the cooking process, and dripping or running of condensate onto or into the engera is undesirable. The rapid evolution of steam during the process may indicate that the cooking of the engera is nearing completion.

As with other such foods, uniform cooking of the engera benefits from a relatively uniformly heated cooking surface. Substantial variations in the heating of the surface can result in some parts of an engera being overcooked and/or other parts being undercooked.

SUMMARY

In one aspect, an electric cooker comprises a pan that may have a planar upper surface portion, and a lid configured such that condensation that collects on its inner surface drains outside the pan. In another aspect, a serpentine heating element may be mounted to the bottom of the pan along a course that reduces disparity in heating of the upper surface of the pan.

DETAILED DESCRIPTION

While a cooker of the embodiments discussed below is suitable for cooking a variety of foods, it is also useful for the cooking of engera. The embodiments below may refer to features and aspects with reference to the cooking of engera for illustrative purposes, but this does not limit the use of the devices depicted and described below solely to the cooking of engera.

Figure 1:
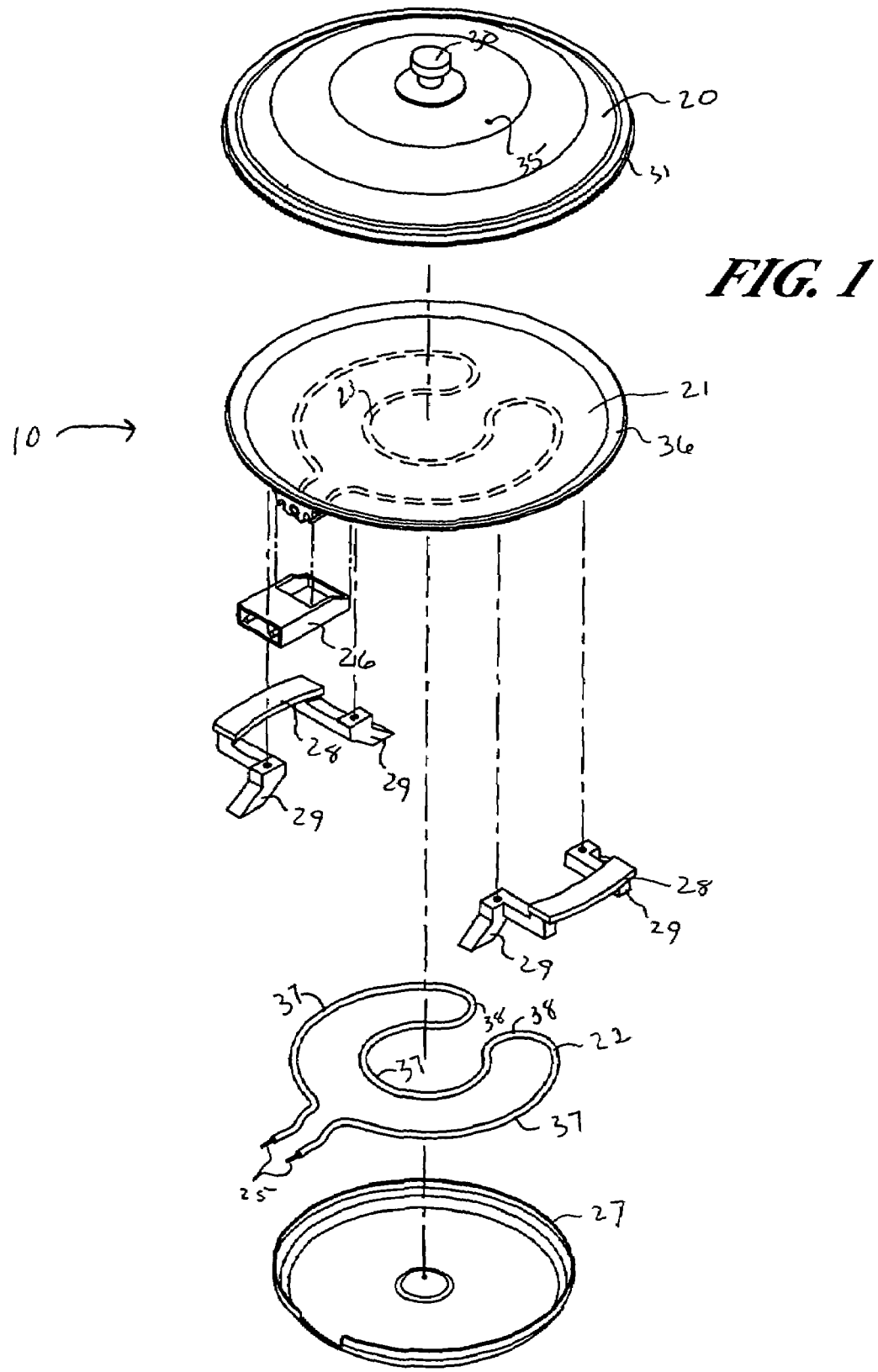
FIG. 1 is an exploded view of one embodiment of a cooker.
Figure 3:
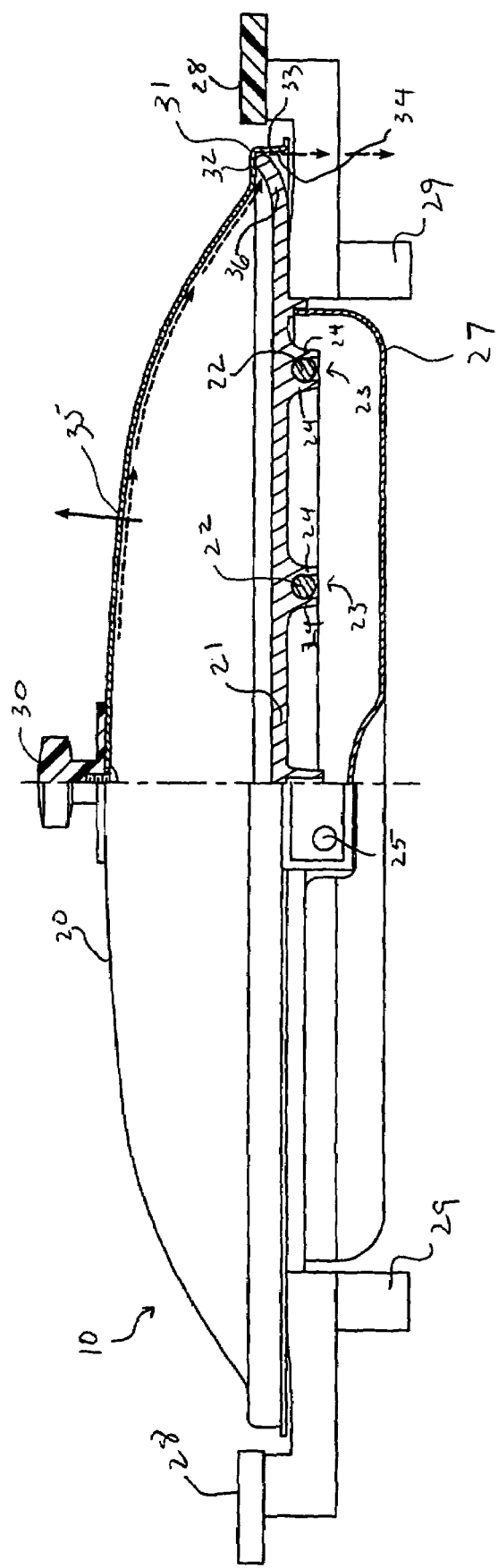
FIG. 3 FIG. 3 is a partial sectional side elevation of the cooker of FIG. 1.

As shown in FIGS. 1 and 3, in one embodiment an electric cooker 10 may comprise a lid 20 that may be placed over the pan 21 of the cooker 10, which may be made of aluminum or other suitable thermally-conductive materials. An electric heating element 22 may be mounted to the bottom of the pan 21, as in channels formed in the bottom of the pan 21 and defined by depending channel walls 24. The ends 25 of the heating element 22 may protrude outward to about the periphery of the pan 21 and may be protected by a shield 26 that acts as a receiver for an electric controller (not shown) that supplies electric power to the heating element 22. The electric controller may be similar in function to those used on electric skillets and like appliances, and controls the temperature of the cooker 10.

The lower portion of the pan 21 may be shielded by a cover 27 that may be fastened to the bottom of the pan 21 by screws or other fasteners. The pan 21 may be supported above a table or other support surface by handles 28 that are mounted to the pan by fasteners such as, for example, screws, and that include depending legs. The handles may be made of a material of comparatively low thermal conductivity, such as a high-temperature plastic. Alternatively, the grip portions of the handles 28 and the bottom of the legs 28 may be made of such low thermal conductivity materials.

Figure 2:
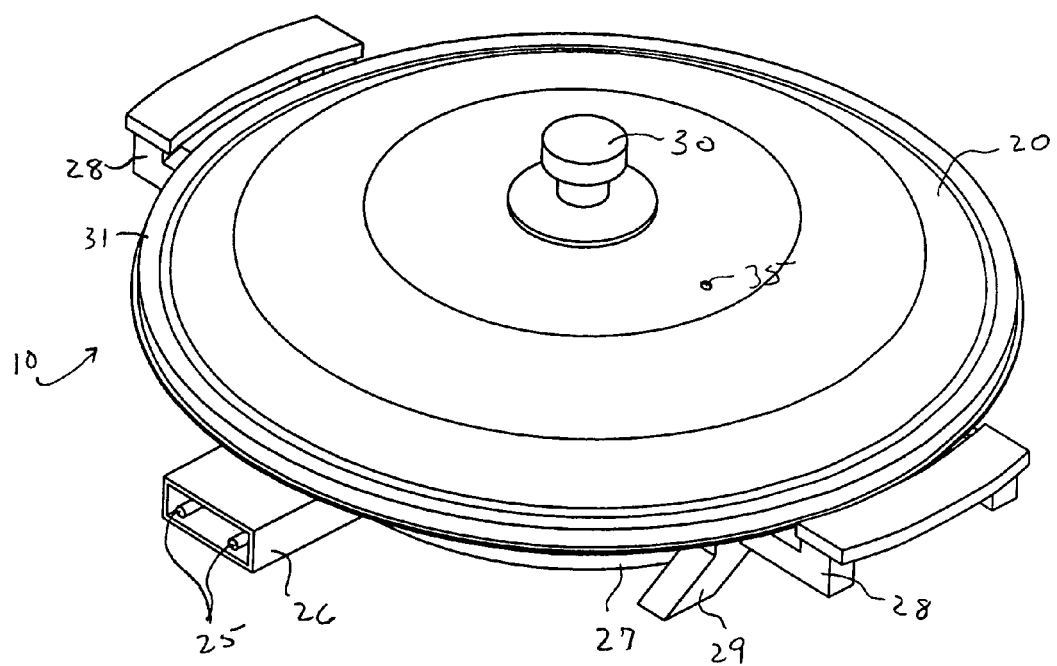
FIG. 2 is an isometric view of the cooker of FIG. 1 with the lid in place.

Referring in particular to FIGS. 2 and 3, in one embodiment, the lid 20 may be made of aluminum or other appropriate material able to withstand the heat to which it may be exposed. A knob 30, that may be of a material of low thermal conductivity, may be mounted at the center of the lid 20. The lid 20 may have a concave inner surface that, for example, slopes downward and outward from the center, such that condensation on the interior of the lid 20 may run along its inner surface to its periphery. A flange 31 may extend around the periphery of the lid 20 and may comprise a first portion 32 that is sloped more nearly horizontally and a second portion 33 that extends downward from the first portion 32. The inner wall 34 of the second portion 33 of the flange 31 may have a diameter that is sufficiently greater than the diameter of the pan 21 so that the cover may be moved laterally while covering the pan. Such a loose fit of the cover 20 on the pan 21 and the extending of the second portion 33 of the flange 31 to a level below that of the edge of the pan 21 may allow condensation to wick past the upper edge of the lip of the pan and drip outside the pan 21 rather than dripping into the pan 21.

A vent 35 may be provided in the lid 20 to allow steam to escape and reduce condensation on the interior of the lid 20. The rapid effusion of steam from the vent 35 may be an indication that the cooking process for engera or the like is approaching, or has reached, completion. The vent 35 may be spaced from the knob 30 such that a flow of steam through the vent 35 is less likely to scald the hand of a person attempting to raise the lid 20 by the knob 30.

Referring to FIGS. 1 and 3, in one embodiment, the pan 21 of the cooker 10 may have a generally planar upper surface except for a narrow, shallow, upturned, annular lip 36 around the periphery of the pan 21. The upper surface of the pan may be coated with a coating that resists sticking, such as fluoropolymer resins, including fluoropolymer resins sold by the DuPont Corporation under the registered trademark TEFLON.

The lip 36 of the pan 31 may be of sufficient height to reduce runoff in the event that the surface on which the cooker 10 is placed is not entirely level, but may be low enough to facilitate removal of delicate food items such as engera with a broad, flat-blade tool that can sufficiently support the food item during its removal so that undue breakage or tearing of the food item does not occur. Such damage may occur if the lip is not sufficiently shallow to permit insertion of the tool under the engera or the like at a shallow angle. The pan 21 may be made from a material such as aluminum that has sufficient thermal conductivity and is of sufficient thickness to spread the heat from the heating element 22 across its surface in a relatively uniform manner.

To facilitate the even spreading of heat across the surface of the pan, the heating element 22 may be formed in a serpentine manner that provides a relatively small maximum distance between points on the surface of the pan 21 and the nearest portion of the heating element 22, thereby promoting relatively even heating of the surface of the pan 21. In one embodiment in which the pan is generally round, and referring to FIG. 1, the heating element 22 may comprise a plurality of concentric circular arcs 37 connected at the end by spanning circular arcs 38.

To improve the uniformity of heat distribution at the surface of the pan, the heating element 22 may be mounted below the bottom surface of the pan 21 in channels 23 defined by walls 24 formed in the bottom of the pan that may be flared outwardly at their base. In addition, the thickness of the pan 21 above the top of the channel may be greater than that of portions of the pan remote from the heating element 22. Both of these measures may increase the uniformity of heating of the upper surface of the pan 21. The walls forming the channel may be formed integrally with the body of the pan, which may be made by casting or other methods.

The heating element 22 may be pressed into the channel 23 and maintained therein by friction and/or by the forming and/or deforming of the walls 24 of the channels. For example, in one embodiment, the walls 24 of the channel 23 may be swaged after mounting of the heating element therein to maintain the heating element in place. Other methods may be used to secure the heating element in the channel 23. In one embodiment, the heating element 22 may be mounted in the channel 23 such that it is not in tight contact with the top of the channel 23 thereby reducing the direct flow of heat from the top of the heating element to the overlying upper surface of the pan.

The cover 27 attached to the bottom of the pan 21 may protect users from inadvertently contacting the heating element 22 or the heated walls 24 of the channel 23.

Although the present invention has been described in considerable detail with reference to certain embodiments, other embodiments are possible. Therefore, the spirit or scope of the appended claims should not be limited to the description of the embodiments contained herein.

I claim:

1. An electric cooker comprising:
    a pan, the pan comprising a flat upper surface in the center and a shallow, upturned lip around its periphery, the outer edge of the lip having an upper edge surface raised above the level of the flat upper surface of the pan, the pan further comprising a lower surface;
    at least one heating element channel depending from the lower surface of the pan, the channel being defined by walls on either side thereof and a top surface, the at least one heating element channel extending beneath the lower surface of the pan along a serpentine course;
    at least one electric heating element mounted in the at least one heating element channel for heating the pan; and
    a lid removably mountable on the pan, the lid having a concave lower surface, the width of the lid being greater than that of the pan, and the edge of the lid fitting loosely over the pan, the looseness of the fit and the concavity of the lid being such that condensation on the lower surface of the lid drains outward along the inner surface of the lid and drains outside the pan.

2. The electric cooker of claim 1 wherein the walls of the channel flare outward and away from the channel adjacent the lower surface of the pan, the distance between the top of the channel and the upper surface of the pan being greater than the distance between the upper surface of the flat upper surface of the pan and the lower surface of the pan.

3. The electric cooker of claim 1 wherein a flange extends downward about the periphery of the lid such that, when the lid is mounted on the pan, the bottom of the flange extends below the upper edge of the lip of the pan.

4. The electric cooker of claim 1 wherein the walls of the heating element channel are deformed inwardly toward one another to maintain the electric heating element in the channel.

5. The electric cooker of claim 1 wherein the pan comprises a cast aluminum body and wherein the walls defining the heating element channel are cast integrally therewith.

6. The electric cooker of claim 2 wherein a flange extends downward about the periphery of the lid such that, when the lid is mounted on the pan, the bottom of the flange extends below the upper edge of the lip of the pan.

7. The electric cooker of claim 1 wherein the cover is vented to allow steam to escape from beneath the cover.

8. The electric cooker of claim 1 wherein the pan is round and wherein the serpentine course of the heating element channel includes a plurality of concentric circular arc sections.

* * * * *